Dec. 1, 1959  W. E. DIEFENDERFER  2,915,277
FLUID DIRECTING MEANS FOR RELIEF VALVE
Filed Oct. 17, 1956

INVENTOR
WILLIAM E. DIEFENDERFER
BY Harris G. Luther
ATTORNEY

2,915,277
FLUID DIRECTING MEANS FOR RELIEF VALVE

William E. Diefenderfer, Wethersfield, Conn., assignor to United Aircraft Corporation, East Hartford, Conn., a corporation of Delaware Application October 17, 1956, Serial No. 616,487

2 Claims. (Cl. 251—118)

This invention relates to fluid control valve mechanism and particularly to mechanism for reducing the effect of dynamic pressure of the controlled fluid on the operation of the valve.

An object of the invention is mechanism for transmitting the dynamic pressure of the controlled fluid to a stationary part of a control valve.

A further object is mechanism utilizing the static pressure of the controlled fluid for actuating the valve and preventing the dynamic pressure of the fluid from materially affecting the valve operation.

A still further object is a valve having a cup shaped portion movable in opening and closing movements along the direction of the flow of fluid to be controlled and guide means supported on the other normally stationary portion of said valve cooperating with said movable portion and directing the fluid to be controlled transversely of the direction of valve movement.

Other objects and advantages will be apparent from the following specification and the attached drawing in which.

Figure 1:
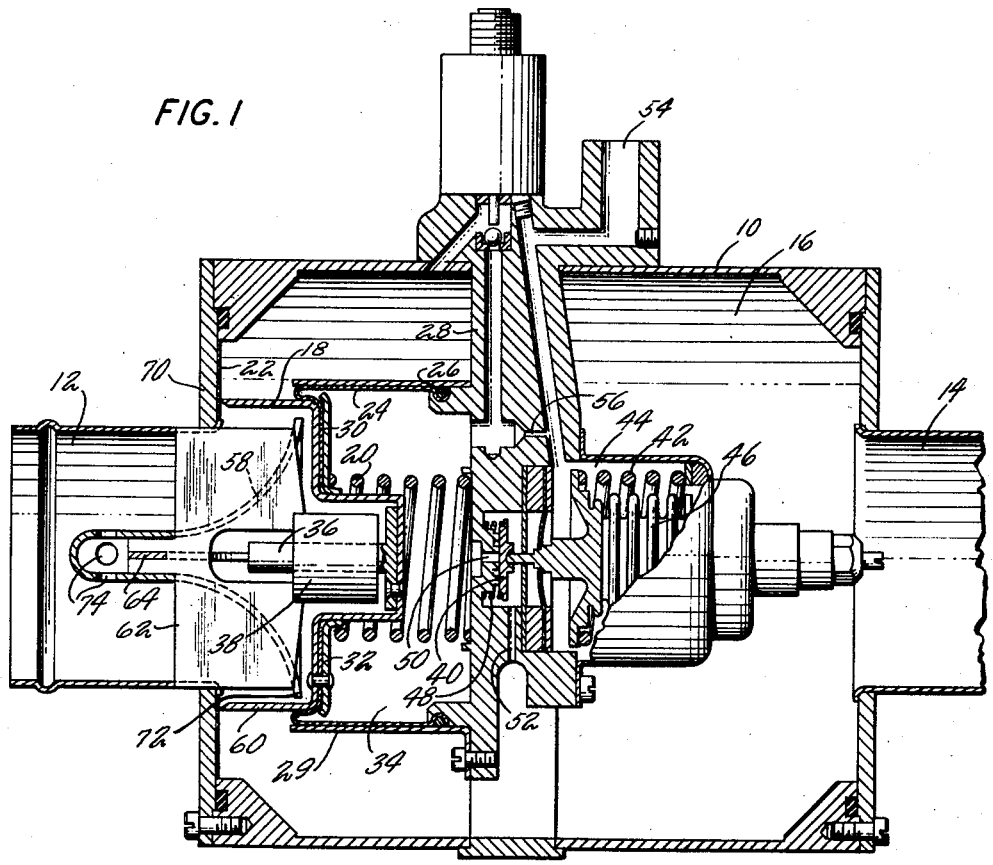
Fig. 1 is a sectional elevation showing the valve and the flared guide means associated therewith.
Figure 2:
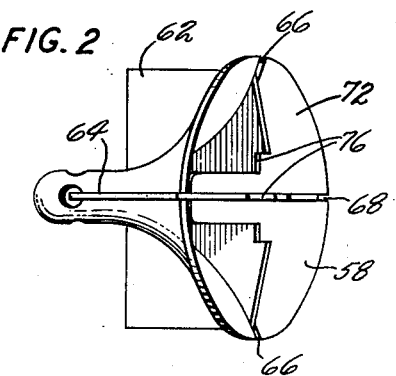
Fig. 2 is a perspective of the flared guide means.

Under some conditions, such as may be encountered in a relief valve in pressurized aircraft fuel tanks or in a cabin pressure regulating valve, it is desirable to regulate the pressure to within very small limits even when the fluid flow through the valve will vary over a large range. For instance, with an air flow varying from zero to 60 pounds per minute, it is desirable to regulate the pressure at some preselected setting, say about 10 p.s.i. to within plus or minus a quarter of a pound per square inch. With relief valves in general, the air flow through the valve affects the valve regulation so that at high air velocities or fluid flow, the valve will be held open by the dynamic pressure of the fluid and will close at a much lower static pressure than is desired; or on the other hand, for small air flows, the valve will have to be set to close at a higher pressure than is desired in order that it will not remain open at too low a pressure under the discharge of larger quantities of the controlled fluid.

This difference in controlled pressure at which the valve will close is caused by the effect of dynamic pressure on the valve. Applicant has installed guide means supported entirely independent of the movable portion of the control valve, which guide means will provide the reaction to the momentum change of the fluid stream, and particularly the force, required to change the direction of flow of the fluid stream in passing through the valve so that the movable portion of the valve is subject only to the static pressure of the controlled fluid and the control of the valve is thus rendered much more accurate.

In the embodiment used to illustrate the invention, but not as a limitation thereof, the valve body 10 has a fluid inlet 12 and a fluid outlet 14 and an intermediate chamber 16 housing the valve and its operating mechanism. The valve comprises a movable cup shaped portion 18, held by a spring 20 against valve seat 22. Diaphragm 24 secured at one edge at 26 to a partition in the chamber 16 and at the other edge 30 to the valve 18 by clamping member 32, forms with the partition and the valve member 18, a chamber 34 into which air under pressure may be introduced or exhausted for providing a force acting on the valve 18 and diaphragm 24 to move the movable valve element 18. A cylindrical annulus 29 supported in partition 28 is used to confine the diaphragm 24.

A valve stem 36 secured to valve element 18 is guided in a bushing 38 for guiding valve element 18 in rectilinear motion longitudinally of the inlet pipe 12. Pressure of the fluid entering inlet pipe 12 acting on the left hand side of diaphragm 24 and valve 18 is opposed by pressure in the chamber 34 and the force of spring 20 and the relative values of these forces will control the movements of the valve element 18. The pressure in the chamber 34 is controlled by means of a valve 40 which is closed by a spring 42 and opened by pressure in the chamber 44 which will compress the evacuated bellows 46 and allow spring 48 to move valve plate 40 and uncover the orifice 50 and bleed pressure fluid from the chamber 34 through passage 52 to the chamber 16 which is at the pressure of the fluid on the downstream side of the valve 18. The pressure of fluid in the chamber 44 is controlled by pressure fluid led in through pipe 54. A restricted bleed 56 will bleed fluid into the chamber 34 to close the valve 18 and when the pressure in line 54 exceeds a predetermined amount, it will open valve 40 to bleed chamber 34 at a rate faster than the air is supplied thereto by the bleed orifice 56. As the valve 18 is actuated by the pressure difference on the opposite sides of the valve and as the spring 20 is a very light spring, it will be apparent that any material variation in the pressure forces, particularly on the upstream side of the valve will render the control of the valve inaccurate. One of these forces is the dynamic force produced in changing the direction of air flow from longitudinally of the inlet 12 to transversely thereof. In order to relieve the valve 18 of this force, a flared or bell mouthed flow directing or guiding member 58 is inserted in the inlet 12 and extending within a cup shaped depression in the valve 18, the sides of which depression are defined by the upstanding rim 60 of the cup shaped valve 18. The flared member 58 is secured in the inlet 12 by means of cross plates 62 and 64 which are slotted and nested with each other on their upstream side and are received in slots 66 and 68 in the member 58. The cross plates 62 and 64 are brazed or otherwise secured in position to the member 58 and also to the inlet pipe 12 which in turn is brazed or otherwise secured to the wall 70 of the chamber 16.

Guide bushing 38 for the valve stem 36 is received in notches 76 in cross plates 62, 64 and is brazed therein so that it is in effect supported on the housing 70.

Member 58 which has an upstream cylindrical surface whose axis is substantially parallel with pipe 12 and the direction of fluid flow in that pipe, flares outwardly as it approaches the valve 18 until it terminates in a flared rim 72 adjacent the upstanding rim 60 of the valve 18 and with the flared rim 72 substantially in a plane at right angles to the axis of the pipe 12 and the direction of movement of the valve 18. This bell mouthed or trumpet shaped member 58 will therefore act to turn the air stream from a flow direction substantially parallel with the axis of the pipe 12 to a direction substantially at right angles thereto. As the member 58 is secured to the housing 70, it will be apparent that any forces produced in thus changing the air flow direction will be absorbed by the housing 70 and will not be transmitted to the valve element 18. In order that static pressure of the fluid in pipe 12 may be utilized to open the valve 18, holes 74 are provided in the member 58, which holes extend substantially normal to the fluid flow at that point and thus lead the static pressure at that point in the fluid stream to the area at the left hand side of the valve element 18. The rim 72 of the member 58 terminates adjacent the upstanding rim 60 of the valve 18 but clearance is provided to avoid any contact or frictional engagement of the two elements. Because of the interference with the air flow by the upstanding rim 60, particularly in a partially open position of the valve, the pressure in the space between the rim 60 and the rim 72 may be somewhat higher than the static pressure adjacent the holes 74. However, as the area of holes 74 is materially larger than the clearance space between the rims 60 and 72, any tendency to increase the pressure on the left hand side of valve 18 will be dissipated by bleeding out through the holes 74 so that at all times the valve 18 will be subject on its upstream side to substantially the static pressure of the fluid in inlet duct 12.

If desired, holes 74 may be placed behind baffles which may act as a form of aspirator so as to tend to reduce the static pressure on the upstream side of valve 18.

Although only one embodiment has been shown and described herein, it will be apparent that various changes and modifications may be made in the construction and arrangement of the various parts without departing from the scope of this novel concept.

I claim:

1. In combination, a conduit, a cup shaped valve element movable longitudinally of the conduit and cooperating with means secured to the conduit for controlling flow through the conduit, a belled fluid guiding element secured to the conduit and having the smaller portion of the element upstream of the belled portion and the rim of the belled portion located adjacent the valve element in the cup portion of the valve element and turning the fluid flow upstream of said valve element from longitudinally of the conduit to transversely of the conduit, the rim of the belled element being spaced from the cup portion of the valve element and providing a leakage path between said rim and the flange forming the cup shape of the valve element for admitting fluid under pressure to the upstream side of said valve element, said fluid guiding element being provided with vent holes for venting the area of the upstream side of said valve element for controlling the static pressure on the valve upstream side.

2. In combination, a conduit, a closure element movable longitudinally of the conduit and cooperating with means secured to the conduit for controlling flow through the conduit, and a curved fluid guiding element secured to the conduit and located adjacent said closure element and turning the fluid flow, upstream of said closure element, from longitudinally of the conduit to substantially at right angles to said conduit as it flows between said closure element and said means, said closure element cooperating with said fluid guiding element to provide a chamber having a leakage path between said closure element and said fluid guiding element, said fluid guiding element being provided with holes normal to the direction of fluid flow for conducting fluid passing through the leakage path back into the fluid stream to maintain the pressure in said chamber substantially equal to the static pressure of the fluid upstream of said closure element.

References Cited in the file of this patent

UNITED STATES PATENTS

| 1,752,439 | Larner | Apr. 1, 1930 |
| 1,892,955 | Kelly | Jan. 3, 1933 |
| 1,936,650 | Wade | Nov. 28, 1933 |
| 2,608,204 | Dunn | Aug. 26, 1952 |

FOREIGN PATENTS

| 766,771 | France | Apr. 23, 1934 |
| 760,971 | Great Britain | Nov. 7, 1956 |